Dec. 3, 1940.     M. E. PEASTER     2,223,854
ANTILEAK NOZZLE
Filed May 11, 1939
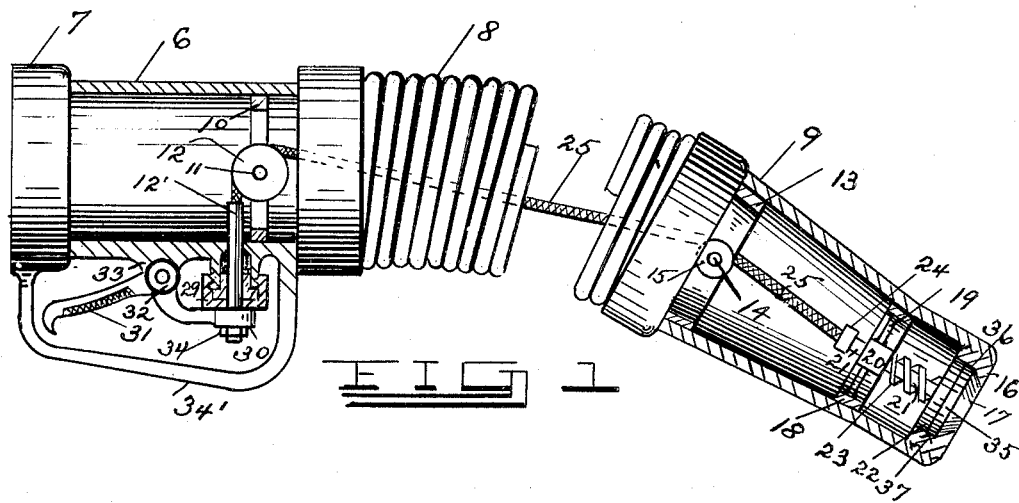
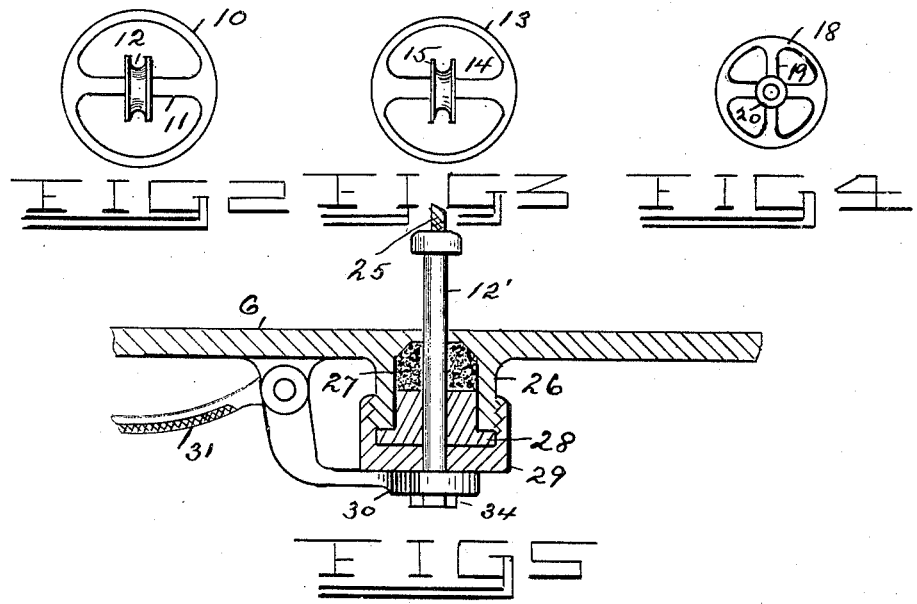
INVENTOR.
Milton E. Peaster Patented Dec. 3, 1940

2,223,854

UNITED STATES PATENT OFFICE 2,223,854

ANTILEAK NOZZLE

Milton E. Peaster, Oklahoma City, Okla.

Application May 11, 1939, Serial No. 273,014

2 Claims. (Cl. 221—84)

This invention relates to an antidrip nozzle for attachment to the delivery-hose of a measuring and dispensing gasoline tank at filling stations, and which nozzle, after being withdrawn from the mouth of the supply tank of an automobile or truck, will not drip on the body of the vehicle.

An object of the invention is to prevent the gasoline in the nozzle from dripping therefrom, after the supply is cut off.

Another, and an important object of the invention is to move all operative parts within the structure, except the valve operator, and some of them in opposed relation to others, and particularly to move the flow releasing media anti-flow-wise.

Another object of the invention is to permit the release of the fluid within the nozzle so as to prevent spraying of the fluid, and cause the movement of the releasing means and the valve to operate flow and anti-flow-wise and also transverse thereto.

A preferred embodiment of the invention is shown on the sheet of drawings, accompanying and forming a part of this specification, and whereon;

Figure 1 is an elevation view, partly in section, showing a hose attaching head; a flexible conduit, a nozzle and operative means for releasing the flow from and stopping the same at the nozzle end.

Figure 2 is an elevation view of a ring fitting in the head and having a shaft for supporting a sheave.

Figure 3 is a similar view showing the ring, shaft, and sheave as located in the nozzle.

Figure 4 shows, in elevation, a ring, a bearing therein, and struts for holding same, and Figure 5 is an enlarged detail view, in elevation, showing the valve operating means, the piston, and packing therefor.

In these several views, similar characters of reference will indicate like parts.

To a delivery hose of a measuring and dispensing tank, is attachable a head 6, having an internally screw threaded bell 7, and to this head is applied a length of flexible conduit 8, shown as partly broken away, and which connects the head with a nozzle 9.

Inserted into the head 6, and maintained therein preferably by sweating is a ring 10 diametrically and horizontally provided with a shaft 11 for a sheave 12.

In the nozzle 9 is a similar ring 13, having a like shaft 14 for a sheave 15.

Within the nozzle 9 is a valve seat ring 16 having a flow opening and an inner valve seat 17, rearward of which and in proximity thereto is a valve stem bearing ring 18 also sweated into place, which, by struts 19 supports centrally a bearing 20 for a valve stem 21, which proceeds rearwardly and inwardly from a valve 22 which is normally held in place to the valve seat 17 while in closed position, by a spring 23 convoluted upon the valve stem 21 and which is interposed between the valve head 22 and the bearing 20. This bearing is in proximity to the valve seat 17, and, together with the valve seat 17, will provide a sufficient guide for the valve head 22 to its seat 17.

The valve stem 21 is provided with a connection 24 to which is attached a flexible cable 25 passing over the sheave 15; through the flexible conduit 8, again over the sheave 12, and is then connected to a piston 12' which reciprocates in a bearing 26, at the head 6 and which consists of a glanded spud provided with a packing 27, and which is held in place by a secondary spud 28, held in place in the gland by a nut 21.

The piston 12' is associated with an ear 30 of the valve operating means 31, by a nut 34 and this valve operator is fulcrumed on a bearing 32 which is supported by a bracket 33 forming a part of the head 6. It is now noticeable that during the movement of the opening and closing operation of the valve operator 31, the valve moves both flow and anti-flow-wise, and that the valve operator 31 moves about an axis transverse to that movement. Both the valve and the valve operating means will be in unison and under the control of the spring 23.

The movement anti-flow-wise of the valve 22, during opening of the nozzle prevents flow spraying.

The valve operating means is protected by a shield 34'.

From the above description, it will be obvious that the valve head 22, is normally forced against the seat 17 by a spring 23. When flow is desired at the nozzle, pressure is applied to the valve operator 31, which operates piston 12', drawing the cable 25 over sheaves 12 and 15 anti-flow-wise and likewise moving the valve stem and valve head.

When pressure on the valve operator 31 is released, the operation is, of course, reversed, the valve seating flow-wise against the valve seat.

While the valve head 22 may be variously constructed, it might be advantageous to insure against leaking, by providing the head 22 with a suitable gasket 36, seatable into a seat 37 just rear of the valve seat 17.

Obviously, looking to the commercial and manufacturing necessities which usually develop, matters of structure may be varied.

Having thus set forth the invention, I claim:

1. An antileak nozzle, comprising a nozzle-head, a valve seat at the forward end thereof, a sheeve ring at the rear part of the nozzle head, a sheeve carried therein, a bearing located between the valve-seat and said ring, a valve adapted to the valve-seat normally, a valve-stem proceeding from same and through said bearing, a spring convoluted about the stem and controlled between the valve-head and the bearing, a hose-connecting head, a ring therein, a sheeve carried in the ring, means to connect the hose connecting head and the nozzle, a trigger movably mounted upon the hose-connecting head and a cable connecting the trigger and the valve stem and trained over said sheeves.

2. In a device of the class described comprising, a nozzle-head having a discharge end, a valve seat in the discharge end of said nozzle-head, a valve for normally resting on said valve seat, a stem extending axially from said valve, a guide ring within said nozzle-head for guiding said stem, a spring encircling said stem between said guide ring and said valve for moving said valve to seated position on said valve seat, a supporting ring within said nozzle-head, a shaft supported by said supporting ring, a sheeve rotatable on said shaft, a cylindrical member having an internally screw-threaded flange on one end for attaching a conduit and having connecting flange on the other end for connection with a flexible conduit, a flexible conduit for joining said cylindrical member with said nozzle-head whereby said nozzle head has free movement with respect to said cylindrical member, a bearing element formed on said cylindrical member, a slidable member movable axially in said bearing element, packing means for said slidable member, a lever for controlling said valve through movement of said slidable member, means for supporting said lever on said cylindrical member, a supporting ring within said cylindrical member, an axle supported by said last mentioned ring, a sheeve rotatably supported on said axle, a flexible connection supported on said sheeves and connecting said slidable member and said stem for transmitting motion from said lever to said valve for controlling said valve.

MILTON E. PEASTER.